United States Patent
Rosenbecker et al.

(10) Patent No.: US 9,211,916 B1
(45) Date of Patent: Dec. 15, 2015

(54) FENDER MADE OF PLASTIC AND COMPRISING A DEFLECTABLE MUDGUARD

(71) Applicant: WEGU GmbH Leichtbausysteme, Kassel (DE)

(72) Inventors: Martin Rosenbecker, Schwuelper (DE); Grit Mueller, Espenau (DE)

(73) Assignee: WEGU HOLDING LEICHTBAUSYSTEME, Kassel (DE)

( * ) Notice: Subject to any disclaimer, the term of this patent is extended or adjusted under 35 U.S.C. 154(b) by 0 days.

(21) Appl. No.: 14/723,730

(22) Filed: May 28, 2015

(30) Foreign Application Priority Data

May 28, 2014 (DE) .......................... 10 2014 107 609

(51) Int. Cl.
 *B62D 25/18* (2006.01)
 *B62D 25/16* (2006.01)

(52) U.S. Cl.
 CPC .............. *B62D 25/161* (2013.01); *B62D 25/16* (2013.01); *B62D 25/165* (2013.01); *B62D 25/18* (2013.01)

(58) Field of Classification Search
 CPC .... B62D 25/16; B62D 25/161; B62D 25/165; B62D 25/168; B62D 25/18; B62D 25/188
 USPC ........ 280/154, 847, 152.1, 152.2, 152.3, 848, 280/849, 851, 159
 See application file for complete search history.

(56) References Cited

U.S. PATENT DOCUMENTS

| | | | | |
|---|---|---|---|---|
| 3,799,580 | A * | 3/1974 | McGuire ........................ | 280/851 |
| 3,870,337 | A | 3/1975 | Gilles et al. | |
| 4,103,918 | A * | 8/1978 | Salden .......................... | 280/851 |
| 4,357,030 | A * | 11/1982 | Verge ............................ | 280/851 |
| 4,427,208 | A * | 1/1984 | Jurges .......................... | 280/848 |
| 4,447,067 | A * | 5/1984 | Yamashita .................... | 280/848 |
| 4,688,814 | A * | 8/1987 | Arenhold ...................... | 280/851 |
| 6,349,987 | B1 * | 2/2002 | Boulbon ....................... | 296/39.3 |
| 6,799,782 | B2 * | 10/2004 | Jain et al. ..................... | 280/848 |
| 6,802,517 | B1 * | 10/2004 | Wuthrich ...................... | 280/157 |
| 6,944,949 | B2 * | 9/2005 | Banry et al. .................. | 29/897.2 |
| 7,258,366 | B2 * | 8/2007 | Yingling et al. .............. | 280/851 |
| 7,909,392 | B2 * | 3/2011 | Takeuchi et al. ............. | 296/198 |
| 8,465,058 | B1 * | 6/2013 | Herrera ........................ | 280/847 |

(Continued)

FOREIGN PATENT DOCUMENTS

DE  296 14 737 U1  11/1996
DE  296 16 393 U1  1/1997

(Continued)

*Primary Examiner* — Hau Phan
*Assistant Examiner* — Jacob Meyer
(74) *Attorney, Agent, or Firm* — Thomas | Horstemeyer, LLP

(57) ABSTRACT

A fender for a wheel rotating about an axis comprises a main fender part extending around the axis, a fender protruding from an axial fender fringe towards the axis, a mudguard comprising a main mudguard section extending downwards from the main fender part and a mudguard skirt protruding towards the wheel axis from an axial mudguard fringe, and an elastic interface. The main fender part, the fender skirt, the main mudguard section, and the mudguard skirt are molded of a same dimensionally stable plastic material. The elastic interface is made of an elastomeric plastic material molded to the main fender part, the fender skirt, the main mudguard section and the mudguard skirt, and connects the main mudguard section of the mudguard to a lower back end of the main fender part, and the mudguard skirt to a lower back skirt end of the fender skirt.

16 Claims, 2 Drawing Sheets

(56) References Cited

U.S. PATENT DOCUMENTS

| | | | |
|---|---|---|---|
| 8,651,528 B2* | 2/2014 | Earl et al. | 280/851 |
| 8,864,176 B2* | 10/2014 | Lasser | 280/851 |
| 8,991,868 B2* | 3/2015 | Ward et al. | 280/851 |
| 9,102,363 B2* | 8/2015 | Atkinson et al. | 1/1 |
| 2002/0109347 A1* | 8/2002 | Sheppard | 280/851 |
| 2003/0116957 A1* | 6/2003 | Cicansky | 280/848 |
| 2003/0151243 A1* | 8/2003 | Horinek | 280/848 |
| 2004/0135362 A1* | 7/2004 | Banry et al. | 280/847 |
| 2012/0068448 A1* | 3/2012 | Lasser | 280/851 |
| 2013/0049320 A1* | 2/2013 | Smith | 280/154 |
| 2014/0001794 A1* | 1/2014 | Hayakawa et al. | 296/198 |
| 2015/0014976 A1* | 1/2015 | Atkinson et al. | 280/848 |

FOREIGN PATENT DOCUMENTS

| | | |
|---|---|---|
| DE | 10 2006 032 289 A1 | 1/2008 |
| GB | 1062554 | 3/1967 |

* cited by examiner

FENDER MADE OF PLASTIC AND COMPRISING A DEFLECTABLE MUDGUARD

CROSS REFERENCE TO RELATED APPLICATIONS

The present invention claims priority to German Patent Application No. DE 10 2014 107 609.5 filed on May 28, 2014 and entitled "Koffluegel aus Kunststoff mit direkt angeformtem, gegenueber einem Hauptbereich des Koffluegels auslenkbarem Schmutzfaenger"

FIELD OF THE INVENTION

The present invention relates to a fender made of plastic for at least one wheel of a motor vehicle rotating about an axis.

The fender, at its inside facing the wheel, may be provided with at least one of a water guiding profile and a spray water minimizing profile. Generally, however, the present invention relates to any fender made of plastic, i. e. with or without such a profile at its inside.

BACKGROUND OF THE INVENTION

DE 10 2006 032 289 A1 discloses a fender made of plastic for at least one wheel of a motor vehicle rotating about an axis. This fender comprises a main fender part extending around the axis, at least one fender skirt protruding from an axial fender fringe of the main fender part towards the axis, and a mudguard protruding downwards from a lower back end of the main fender part and deflectable with regard to the main fender part, the main fender part and the at least one fender skirt being made of the same dimensionally stable plastic material. The mudguard is an essentially flat rag of an elastic plastic material molded to the lower back end of the main fender part. Further, screw bosses for attaching a replacement mudguard are provided above the lower back end of the main fender part. Fastening screws may be screwed into the screw bosses for attaching the replacement mudguard to the main fender part, when the integrally molded mudguard is worn-out. Prior to attaching the replacement mudguard, the worn-out integrally molded mudguard is cut off the main fender part.

DE 296 16 393 U1 discloses a mudguard for motor vehicles which, besides an abutment area for attaching the mudguard to a fender and a main mudguard section, comprises a strip shaped deformation area which is enclosed by other parts of the mudguard. By absorbing all necessary deformations, the deformation area allows for adapting the abutment area of the mudguard to the contour of the respective fender without deforming the main mudguard section of the mudguard.

U.S. Pat. No. 3,870,337 A describes a casing for tracklaying and wheel-equipped vehicles. This casing made of an elastic material is variable in length in that the casing is provided with an articulation point. The articulation point is formed by a reduction in the wall thickness of the casing, or by recesses in the casing arranged side by side. The articulation point allows for lifting a lower part of the casing upwards. For fixing the lifted lower part, hooks are provided in an upper part of the casing, and holes or slots are provided in the lower part. The casing provided for the rear of the vehicle has an angular shoulder on its outer end. The angular shoulder stabilizes the upper part of the casing.

DE 296 14 737 U1 discloses a fender element for minimizing spray water produced by a vehicle. The fender element consists of a first lower section and a second upper section which are connected via a flexible seam. The fender segment has a rectangular shape including a base plate on which all further parts of the fender element are arranged and with which all further parts of the fender element are made as one part. The base plate and all other parts of the fender element are made of a thermosetting or thermoplastic material by injection or rotation molding. The upper second section has a slightly curved base plate for adapting the fender element to the curvature of a fender such that the fender element may be an inner lining of the fender. The lower first section forms a mudguard extending downwards from the fender which may swivel around the seam against the travelling direction of the vehicle. In the opposite direction such a swivel movement is limited in that the seam is compressed and in that angular shoulders of the first and the second section abut against each other. At the height of the flexible seam, the angular shoulders are separated by a slot corresponding to the height of the flexible seam. Further, the shoulders of the first and the second section are arranged at different angles with regard to the base plates of the first and the second section.

GB 1,062,554 A discloses an essentially flat mud flap having a resiliently extensible element for connecting the upper edge of the mud flap to a motor vehicle. The element is resiliently extensible to accommodate downward movement of the flap. Further, a pair of stiffening plates are provided, one for attachment to each side of the flap. These plates prevent the flap from swinging rearwards, i. e. out of its own plane, as a result of flexing the element.

There still is a need of a fender made of plastic which has a high efficiency, i. e. which is able to contribute to spray water minimization, and which nevertheless may be both produced at low cost and give way to obstacles without being damaged.

SUMMARY OF THE INVENTION

The present invention relates to a fender for at least one wheel of a motor vehicle, the at least one wheel rotating about an axis. The fender comprises a main fender part extending around the axis and including an axial fender fringe and a lower back end, at least one fender skirt protruding towards the axis from the axial fender fringe and including a lower back skirt end, and a mudguard. The main fender part and the at least one fender skirt are one integral part molded of a dimensionally stable plastic material. The mudguard comprises a main mudguard section extending downwards from the lower back end of the main fender part and including an axial mudguard fringe, and at least one mudguard skirt protruding towards the axis from the axial mudguard fringe and extending downwards from the lower back skirt end. The main mudguard section and the at least one mudguard skirt being molded of the same dimensionally stable plastic material as the main fender part and the at least one fender skirt. The fender further comprises an elastic interface made of an elastomeric plastic material and molded to the dimensionally stable plastic material of the main fender part, the at least one fender skirt, the main mudguard section and the at least one mudguard skirt. The elastic interface connects the main mudguard section of the mudguard to the lower back end of the main fender part, and the at least one mudguard skirt to the lower back skirt end of the at least one fender skirt.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWING

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
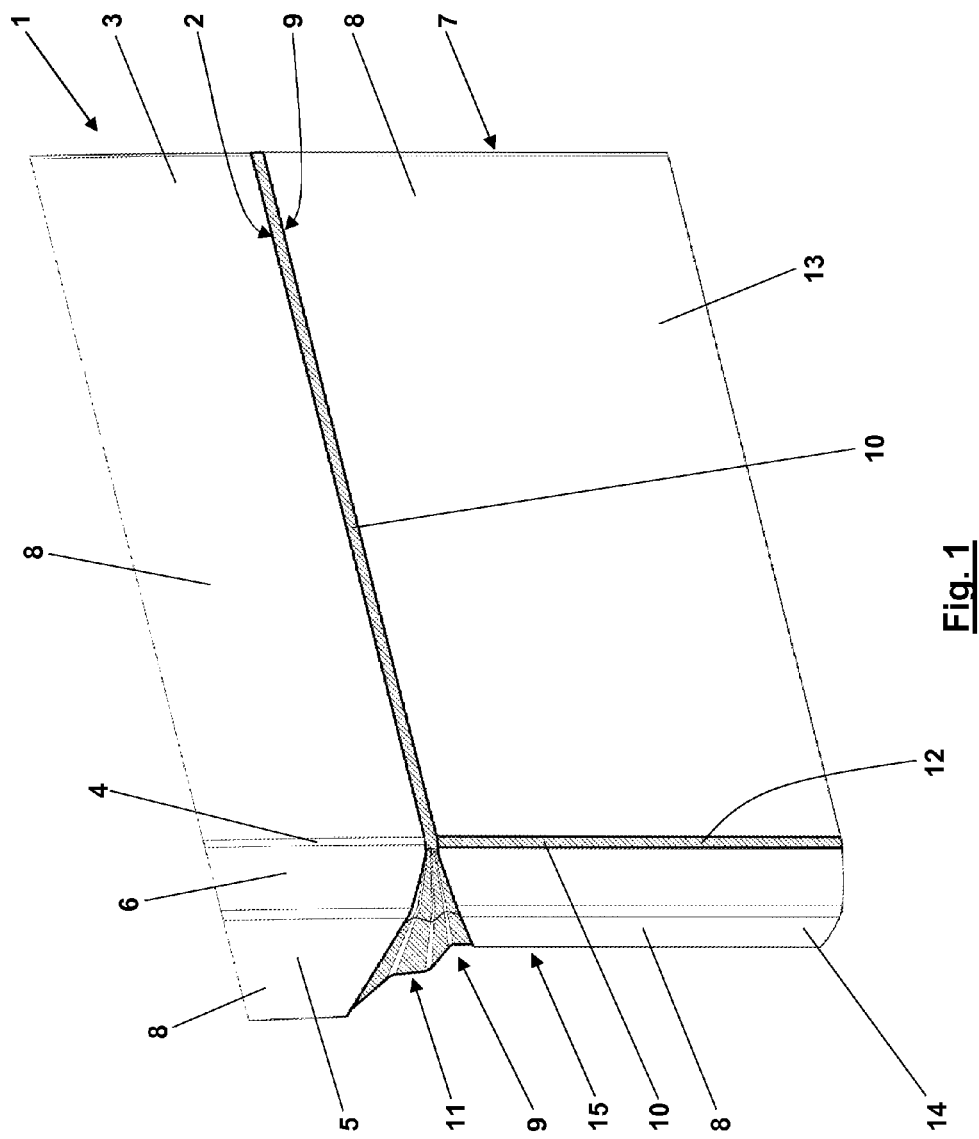
FIG. 1 shows a lower back end of a main fender part of a fender according to the present invention made of plastic to which a mudguard is integrally molded via an elastic interface.

A fender made of plastic for at least one wheel of a motor vehicle, which rotates about an axis, comprises a main fender part extending around the axis, and at least one fender skirt protruding towards the axis from an axial fender fringe of the main fender part. The main fender part and the at least one fender skirt are one part integrally molded of a dimensionally stable plastic material. The fender further comprises a mudguard attached to a lower back end of the main fender part. The mudguard comprises a main mudguard section, and a mudguard skirt protruding towards the axis from an axial mudguard fringe of the main mudguard section. The main mudguard section and the mudguard skirt are molded of the same dimensionally stable plastic material as the main fender part and the fender skirt. The main mudguard section is connected to the lower back end of the main fender part, and the mudguard skirt is connected to a lower back end of the fender skirt, both via an elastic interface made of elastomeric plastic material and molded to the dimensionally stable plastic material of the main fender part, the fender skirt, the main mudguard section and the mudguard skirt.

The elastic interface allows the mudguard to be deflected, i. e. give way to any obstacles by swiveling backwards about the lower back end of the main fender part. However, the mudguard will not be deflected by aerodynamic forces or by spray water produced by the rotating wheel, only. This is due to the fact that the basic position of the mudguard is stabilized by the elastic interface also extending between the lower back end of the fender skirt and the mudguard skirt.

It is to be understood that the main fender part of the fender extending around the axis does not require that the main fender part is shaped like a section of a cylinder jacket, the axis being the cylinder axis. Instead, the main fender part may, for example, comprise a plurality of straight sections extending around the axis and connected at blunt angles.

The fender according to the present invention made of plastic may either be provided for a single axle, a twin axle or any multiple axle of a motor vehicle with a plurality of wheels rotating about parallel axes.

It is to be understood, that the main fender part of the fender according to the present invention extends around the axis over a certain part of an entire circle, only. This part may be between less than a quarter up to more than a half of an entire circle.

The fender according to the present invention comprises at least one fender skirt. It may, however, also have two fender skirts, one at each axial fender fringes of its main fender part. If only one fender skirt is provided, it will typically be provided at the far side of the fender, i. e. at the far end of the fender with regard to the longitudinal middle axis of the respective motor vehicle. Each fender skirt is molded of the same dimensionally stable plastic material as the main fender part of the fender, and all fender skirts and the main fender part are one integral part.

The formulation that the elastic interface of the fender according to the present invention is molded to the dimensionally stable plastic material of the main fender part, the fender skirt, the main mudguard section and the mudguard skirt, means that its elastomeric plastic material is injection molded to the dimensionally stable plastic material in an injection mold which is also used for injection molding the main fender part, the fender skirt, the main mudguard section and the mudguard skirt of the dimensionally stable plastic material. By means of injection molding, the elastomeric plastic material of the elastic interface is permanently bonded to the main fender part, the fender skirt, the main mudguard section and the mudguard skirt.

Although the mudguard, the mudguard skirt, the main fender part and the fender skirt of the fender according to the present invention are made of the same dimensionally stable plastic material, this does not exclude that the composition of the dimensionally stable plastic material displays irrelevant variations, particularly small variations which even occur, if it is desired to make these form parts of a same plastic material of constant composition.

In the fender according to the present invention, the mudguard, via the elastic interface made of the elastomeric plastic material, is both connected to the main fender part and the at least one fender skirt. Via deformation of this elastic interface, the mudguard may be deflected with regard to the main fender part. Not only due to the elastomeric plastic material being bonded to the main fender part but particularly due to the elastomeric plastic material of the elastic interface being additionally bonded to the fender skirt, the mudguard is subject to a restoring force directing it back into its basic position within which it fulfills its function as a mudguard and in spray water minimizing to a maximum extend. Due to being at least essentially made of the same dimensionally stable plastic material as the main fender part and the fender skirt of the fender, the mudguard, in this basic position, has a defined three-dimensional shape.

Because the mudguard is at least essentially made of the same dimensionally stable plastic material as the main fender part and the fender skirt of the fender, the integral mudguard only causes comparatively low material cost, particularly as a desired dimensional stability of the mudguard is already achieved at a low thickness of the dimensionally stable plastic material. Experiences carried out by the inventors showed that a suitable fender made of plastic and having an integral mudguard may not be realized with a single plastic material only, like for example by forming an integral hinge of the plastic material between the main fender part and the mudguard. Such an integral hinge is not able to stand the stresses occurring in using the fender with a lorry, for example, resulting in the mudguard being teared of the main fender part in an uncontrolled way.

In the fender according to the present invention, a permanently elastic and thus permanent connection is achieved at still acceptable material and production cost by means of limited use of the more expensive elastomeric plastic material for forming the elastic interface between the main fender part and the fender skirt on the one hand and the mudguard on the other hand.

The mudguard of the fender according to the present invention, besides a main mudguard section which is made of the same dimensionally stable plastic material as the main fender part and the at least one fender skirt and which is connected to the main fender part via the elastic interface, comprises at least one mudguard skirt, which is also made of the dimensionally stable plastic material and which, via the elastic interface, is connected to the at least one fender skirt. Thus, the fender skirt is continued by means of the mudguard skirt. It is to be understood, however, that the mudguard skirt does not need to be as wide or broad as the fender skirt when viewed in axial direction. Often, the mudguard skirt will not be as broad as the fender skirt. Generally, however, the mudguard skirt may even be broader than the fender skirt.

In the fender according to the present invention, the main mudguard section and the at least one mudguard skirt of the mudguard may be connected via an appendix of the elastic interface made of the elastomeric plastic material and molded to the main mudguard section and the mudguard skirt. This means, that the appendix of the interface also separates the at least one mudguard skirt form the main mudguard section of the mudguard to such an extent, that a relative movement of these two parts is possible under elastic deformation of the elastomeric plastic material in the appendix of the interface.

Further, the main mudguard section of the mudguard of the fender according to the present invention may be subdivided into a plurality of mudguard parts. Any two neighboring mudguard parts of the plurality of mudguard parts may then be connected to each other by an appendix of the elastic interface made of the elastomeric plastic material and molded to the neighboring mudguard parts. In this way, further controlled deformations of the mudguard are enabled.

Along the lower back end of the main fender part of the fender, the elastic interface between the main fender part and the mudguard may be a strip of constant width made of the elastomeric plastic material. This strip may be quite narrow and thus only require a low amount of the elastomeric plastic material.

At the lower back end of the fender skirt, the width of the elastic interface preferably increases towards the axis. In this way, a uniform stress to the elastomeric plastic material is achieved, when the main mudguard section of the mudguard is swiveled about the interface at the lower back end of the main fender part.

Further, the elastic interface, in a direction from the lower back end of the at least one fender skirt towards the at least one mudguard skirt may have a non-straight, particularly a wavy or zigzag course. Such a shape of the interface allows for particularly strong deformations of the interface without any punctual stress to the elastomeric plastic material.

As already indicated at the beginning, the fender according to the present invention may, at its inside facing the axis, be provided with a water guiding profile and/or spray water minimizing profile. Typically, such a water guiding profile and/or spray water minimizing profile is at least provided in partial areas of the main fender part. The same or another water guiding profile and/or spray water minimizing profile may, however, also be provided at the inside of the mudguard facing the axis.

In the fender according to the present invention it is also an option to separate a worn mudguard from the remainder of the fender along the interface, and to mount a replacement mudguard to the main fender part. For this purpose, a plurality of screw bosses made of the dimensionally stable plastic material and integrally molded in one piece with the main fender part may be provided above the lower back end of the main fender part.

For manufacturing a high value fender made of plastic according to the present invention, thermoplastic materials may be used. The thermoplastic material for the main fender part, the fender skirt, the main mudguard section and the mudguard skirt may be a propylene whereas the elastomeric plastic material of the elastic interface may be a thermoplastic elastomer.

Now referring in greater detail to the drawings, FIG. 1 shows those parts of a fender 1 made of plastic, which are essential for the present invention. These essential parts include the lower back end 2 of a main fender part 3. The main fender part 3 extends around an axis of a motor vehicle not depicted here. A wheel for which the fender 1 is provided but which is also not depicted here rotates about the axis. At an axial fender fringe 4 of the main fender part, a fender skirt 5 protrudes towards the axis. A phase 6 is provided between the main fender part 3 and that part of the fender skirt which extends in a radial plane with regard to the axis. A mudguard 7 essentially consists of a same dimensionally stable plastic material 8 of which the main fender part 3 and the fender skirt 5 are integrally made as one part, i. e. injection molded. Particularly, the dimensionally stable plastic material 8 is a thermoplastic material 8, even more particularly propylene. Between the mudguard 7 and the main fender part 3 and the fender skirt 5 all made of the dimensionally stable plastic material 8, an elastic interface 9 made of an elastomeric plastic material 10 is provided. The elastomeric plastic material 10 is injection molded to the main fender part 3 and the fender skirt 5 on the one hand and to the mudguard 7 on the other hand. The mudguard 7 is also injection molded, particularly in a same injection mold as the main fender part 3 and the fender skirt 5, and before a caliber is drawn from the injection cavity to make space or provide a clearance for the elastomeric plastic material 10 of the elastic interface 9. Into this space or clearance, the elastomeric plastic material 10 is injected into the injection mold for forming permanent connections of the elastomeric plastic material 10 to the main fender part 3 and the fender skirt 5 on the one hand and to the mudguard 7 on the other hand. Along the lower back end 2 of the main fender part 3 the elastic interface 9 is a narrow strip of the elastomeric plastic material 10. In the area of the fender skirt, however, its width increases towards the axis. Further, it has a zigzag course 11, here. Due to this shape of the interface 9, the mudguard 7 may swivel backwards about the lower back end 2 of the main fender part 3 without causing a punctual overstress and thus a damage to the elastomeric plastic material 10. An appendix 12 of the elastic interface 9 made of elastomeric plastic material 10 extends between a main mudguard section 13 and a mudguard skirt 14 of the mudguard 7 and completely separates these two parts of the mudguard 7 which are each made of the dimensionally stable plastic material 8. Thus, the mudguard skirt 14 protruding towards the axis may move with regard to the main mudguard section 13 of the mudguard 7 against an elastic restoring force about the stripe-shaped appendix 12 in giving way to obstacles, for example. The shape of the mudguard skirt 14 is adapted to the shape of the fender skirt 5. The mudguard skirt 14, however, has a smaller width than the fender skirt 5, i. e. it does not protrude as far from the main mudguard section 13 towards the axis as the fender skirt 5 protrudes from the main fender part 3.

At the inside 15 of the fender 1 facing towards the axis, and preferably also in the area of the mudguard 7, a spray water minimizing profile for collecting and removing water flying of the wheel covered by the fender 1 is provided.

Figure 2:
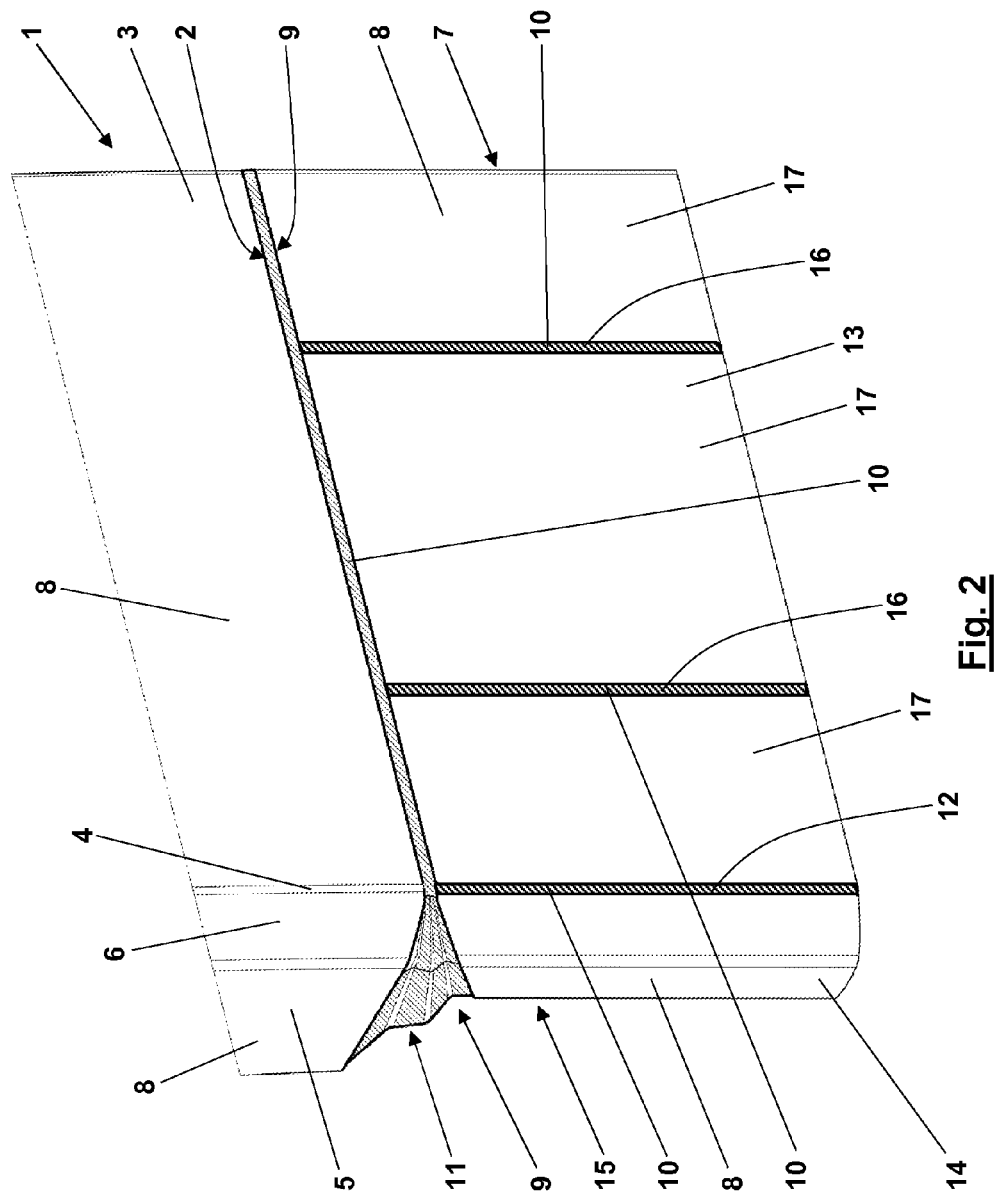
FIG. 2 shows the lower back end of the main fender part of another fender according to the present invention made of plastic to which a mudguard comprising a plurality of mudguard parts is integrally molded via the elastic interface.

The fender 1 shown in FIG. 2 differs from the embodiment of the fender shown in FIG. 1 in that the main mudguard section 13 of the mudguard 7 is subdivided by further appendices 16 of the elastic interface 9 made of the elastomeric plastic material 10. Each appendix 16 connects two neighboring mudguard parts 17 in a way allowing for relative movements of these mudguard parts 17 against elastic restoring forces.

Many variations and modifications may be made to the preferred embodiments of the invention without departing substantially from the spirit and principles of the invention. All such modifications and variations are intended to be included herein within the scope of the present invention, as defined by the following claims.

We claim:

1. A fender for at least one wheel of a motor vehicle, the at least one wheel rotating about an axis, the fender comprising
    a main fender part extending around the axis and including an axial fender fringe and a lower back end,
    at least one fender skirt protruding towards the axis from the axial fender fringe and including a lower back skirt end,
        the main fender part and the at least one fender skirt being one integral part molded of a dimensionally stable plastic material,
    a mudguard comprising:
        a main mudguard section extending downwards from the lower back end of the main fender part and including an axial mudguard fringe;
        at least one mudguard skirt protruding towards the axis from the axial mudguard fringe and extending downwards from the lower back skirt end,
            the main mudguard section and the at least one mudguard skirt being molded of the same dimensionally stable plastic material as the main fender part and the at least one fender skirt,
    wherein an elastic interface made of an elastomeric plastic material and molded to the dimensionally stable plastic material of the main fender part, the at least one fender skirt, the main mudguard section and the at least one mudguard skirt connects the main mudguard section of the mudguard to the lower back end of the main fender part, and the at least one mudguard skirt to the lower back skirt end of the at least one fender skirt.

2. The fender of claim 1, wherein the main mudguard section and the at least one mudguard skirt are connected via an appendix of the elastic interface made of the elastomeric plastic material and molded to the main mudguard section and the at least one mudguard skirt.

3. The fender of claim 2, wherein the main mudguard section is subdivided into a plurality of mudguard parts, any two neighboring mudguard parts of the plurality of mudguard parts being connected to each other via an appendix of the elastic interface made of the elastomeric plastic material and molded to the neighboring mudguard parts.

4. The fender of claim 1, wherein the main mudguard section is subdivided into a plurality of mudguard parts, any two neighboring mudguard parts of the plurality of mudguard parts being connected to each other via an appendix of the elastic interface made of the elastomeric plastic material and molded to the neighboring mudguard parts.

5. The fender of claim 1, wherein the elastic interface, between the lower back end of the main fender part and the main mudguard section, is a strip of constant width made of the elastomeric plastic material.

6. The fender of claim 5, wherein a width of the elastic interface, between the lower back skirt end and the at least one mudguard skirt increases towards the axis.

7. The fender of claim 1, wherein a width of the elastic interface, between the lower back skirt end and the at least one mudguard skirt increases towards the axis.

8. The fender of claim 7, wherein the elastic interface, in a direction from the lower back skirt end towards the at least one mudguard skirt, has a wavy or zigzag course.

9. The fender of claim 1, wherein the elastic interface, in a direction from the lower back skirt end towards the at least one mudguard skirt, has a wavy or zigzag course.

10. The fender of claim 1, wherein the main fender part, at its inside facing the axis, is provided with at least one of a water guiding profile and a spray water minimizing profile.

11. The fender of claim 10, wherein the main mudguard section, at its inside facing the axis, is provided with at least one of a water guiding profile and a spray water minimizing profile.

12. The fender of claim 1, wherein the main mudguard section, at its inside facing the axis, is provided with at least one of a water guiding profile and a spray water minimizing profile.

13. The fender of claim 1, wherein a plurality of screw bosses made of the dimensionally stable plastic material and molded in one piece with the main fender part are provided above the lower back end of the main fender part.

14. The fender of claim 1, wherein the dimensionally stable plastic material is a thermoplastic resin.

15. The fender of claim 14, wherein the elastomeric plastic material is a thermoplastic elastomer.

16. The fender of claim 1, wherein the elastomeric plastic material is a thermoplastic elastomer.

* * * * *